March 27, 1928.

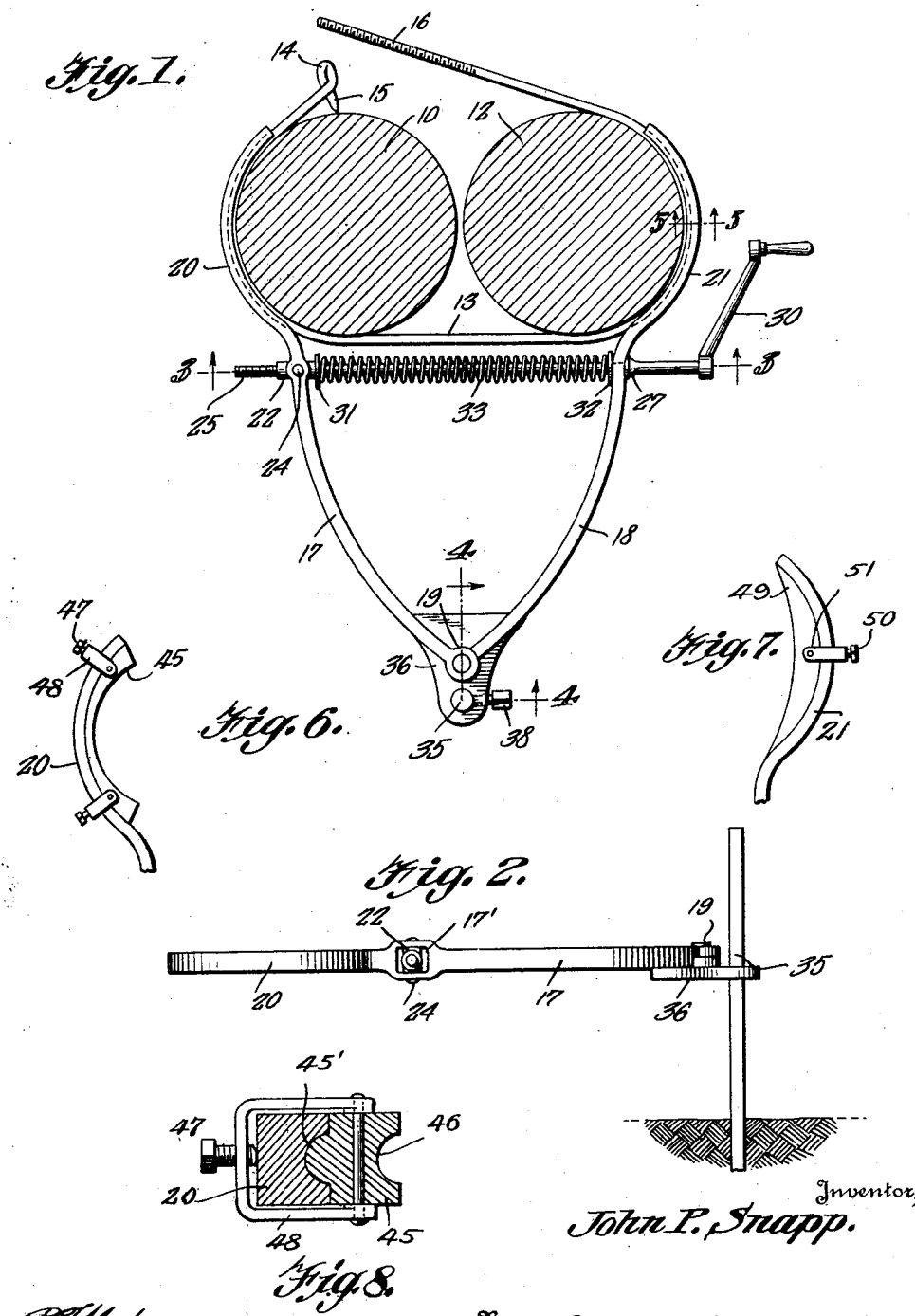

J. P. SNAPP

SPLICING TOOL

Filed May 7, 1926

Inventor,
John P. Snapp.

By Victor J. Evans
Attorney

WITNESS:

Patented Mar. 27, 1928.

1,663,866

UNITED STATES PATENT OFFICE.

JOHN PEMBERTON SNAPP, OF LIMESTONE, TENNESSEE.

SPLICING TOOL.

Application filed May 7, 1926. Serial No. 107,482.

The object of this invention is to provide a tool adapted to retain the upper and lower sections of a pole, such as a telegraph pole, to be spliced, while the splice per se is being produced.

A further object is to provide a form of vise, comprising a plurality of pivotally connected jaws, the jaws having channel portions formed on the inner sides thereof, and clamping means being provided, the clamping screw being surrounded by a spring, for the purpose indicated below.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a view showing the tool in top plan, the pole section to be spliced appearing in horizontal section.

Figure 2 is a view of the tool in edge elevation.

Figures 6 and 7 show detachable elements for connection with the jaws and having work engaging surfaces of a curvature differing from that of the jaws.

Fig. 8 is a section thru one of the jaws and a detachable element carried thereby.

Figure 3:
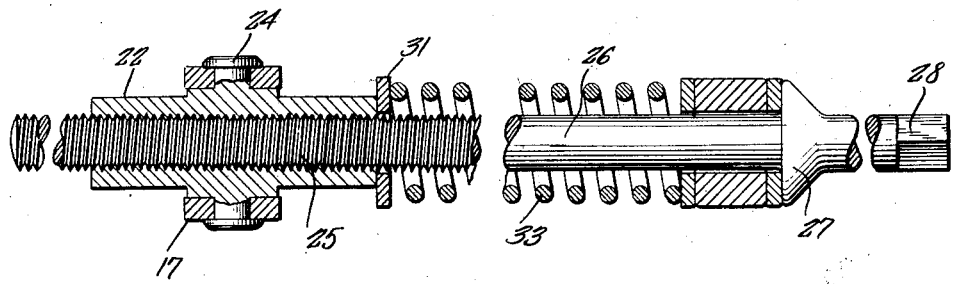
Figure 3 is a section on line 3—3 of Figure 1.
Figure 4:
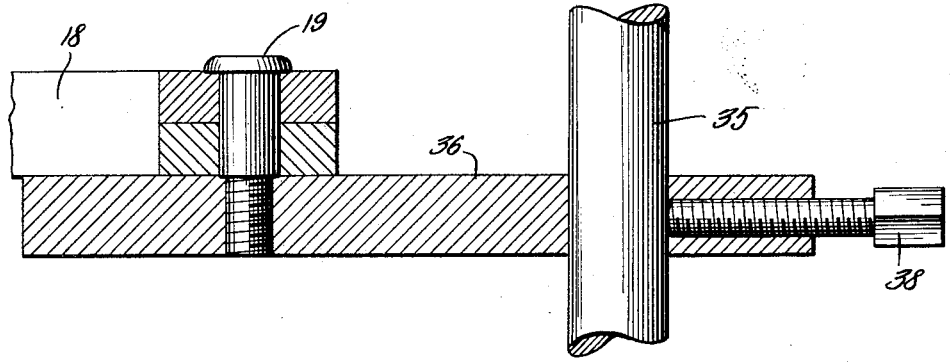
Figure 4 is a section on line 4—4 of Figure 1.
Figure 5:
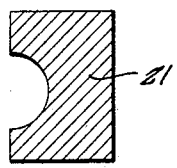
Figure 5 is a section on line 5—5 of Figure 1.

The pole sections to be spliced are designated 10 and 12 and the splicing element is shown at 13, and consists of an open loop of heavy wire or the like, this loop having formed on one end thereof an eye 14, the extreme end constituting a spike shown at 15. The opposite end of the element 13 is threaded as shown at 16, and the threaded portion passes thru the eye 14, and is adapted to be secured by means of a nut or the like, in the manner shown in my Patent No. 1,633,129, issued June 21, 1927, in which the splicing member is claimed.

The vise or tool, includes the legs 17 and 18 pivotally connected at 19, and formed with jaws 20 and 21, the latter channeled on the inner sides thereof, in order to receive the aforesaid loop member. Leg 17 is provided with an opening 17', and a sleeve 23 passes thru the opening and is pivotally mounted, as by trunnions or the like 24. Sleeve 22 is threaded, and receives the threaded portions 25 of a rod 26, and this entire element may be referred to as a screw, the portion 26 having a shoulder 27 bearing against the outer side of leg 18, or against a washer interposed between the shoulder and the leg. The screw or threaded bar or rod is rotatable in any suitable manner, for instance as by providing an angular portion 28 to be engaged by the socket member of a crank 30.

Washers 31 and 32 may be located as indicated in the drawing, and a coiled spring 33 surrounds rod 26 and is positioned between washers 31 and 32, the spring being of the expansion type and tending to hold the jaws open, when the screw permits, or to the extent permitted by said screw. The brace may be supported from the ground, by means of an iron stake or the like designated 35 and adapted to pass thru a plate 36 secured to the closed portion of the vise, as for instance by means of the pivot at 19, or in other suitable manner. The plate 36 extends below and supports the legs 17 and 18 at the point where they converge, and a set screw 38 retains the rod 35 in an adjusted position with reference to element 36. The set screw 38 has an angular head, and may be set up as tightly as desired, or as required for the purpose. In order to set up the main screw 25, when the tool is employed at a point where additional leverage is necessary, any suitable device may be applied to end 28 in lieu of the crank 30.

In order to employ the vise in connection with poles of different sizes, I provide detachable segmental devices adapted to be affixed to the jaws 20 and 21. One of these devices is designated 45, and is curved to conform to the curvature of the jaw and to the curvature of a pole of less diameter. This element 45 is grooved or channeled at 46 and is retained by screw 47 passing thru yoke members 48. Rib 45' engages the groove of the jaw.

The device 49 is of similar construction, but heavier, and may be retained by one screw 50 passing thru pivoted yoke members such as 51, it being understood that this device 49 is curved to fit a pole of still different diameter.

Having thus described the invention, what is claimed as new is:

1. In a device of the class described, a pair of pivotally connected legs, jaws formed on the legs and curved in opposite directions, and detachable curved segmental elements carried by said jaws, these elements being channeled longitudinally, and having work engaging surfaces of a curvature differing from the curvature of the jaws.

2. In a device of the class described, a pair of pivotally connected legs, jaws formed on the legs and curved in opposite directions, said jaws being channeled longitudinally on their inner sides, and detachable curved segmental elements carried by said jaws, these elements being channeled longitudinally, and having work engaging surfaces of a curvature differing from the curvature of the jaws.

3. In a device of the class described, a pair of pivotally connected legs, means for mechanically forcing the legs toward each other, resilient means tending to separate the legs when released, jaws formed on the legs and curved in opposite directions, and detachable curved segmental elements carried by said jaws, these elements being channeled longitudinally, and having work engaging surfaces of a curvature differing from the curvature of the jaws.

4. In a device of the class described, a pair of pivotally connected legs, the legs being movable about a vertical axis, and means extending perpendicularly of the legs for supporting said legs at different distances above the surface of the ground, jaws formed on the legs and curved in opposite directions, and detachable curved segmental elements carried by said jaws, these elements being channeled longitudinally, and having work engaging surfaces of a curvature differing from the curvature of the jaws.

In testimony whereof I affix my signature.

JOHN PEMBERTON SNAPP.